United States Patent
Verma et al.

(10) Patent No.: US 9,104,234 B2
(45) Date of Patent: Aug. 11, 2015

(54) METHOD AND SYSTEM FOR QUANTITATIVE DETERMINATION OF SOFTWARE EASE OF USE

(75) Inventors: Dinesh Chandra Verma, Mount Kisco, NY (US); Paridhi Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 2201 days.

(21) Appl. No.: 12/057,950

(22) Filed: Mar. 28, 2008

(65) Prior Publication Data

US 2008/0209230 A1    Aug. 28, 2008

Related U.S. Application Data

(63) Continuation of application No. 11/327,068, filed on Jan. 6, 2006, now abandoned.

(51) Int. Cl.
*H04L 29/00* (2006.01)
*G06F 3/01* (2006.01)

(52) U.S. Cl.
CPC ..................... *G06F 3/015* (2013.01)

(58) Field of Classification Search
USPC .................................. 382/115, 119
See application file for complete search history.

(56) References Cited

U.S. PATENT DOCUMENTS

| | | | |
|---|---|---|---|
| 3,855,998 A | 12/1974 | Hidalgo et al. | |
| 6,040,821 A * | 3/2000 | Franz et al. | 345/159 |
| 6,309,342 B1 | 10/2001 | Blazey et al. | |
| 6,520,905 B1 | 2/2003 | Surve et al. | |
| 6,688,457 B2 | 2/2004 | Haubert et al. | |
| 6,888,457 B2 | 5/2005 | Wilkinson et al. | |
| 6,922,664 B1 | 7/2005 | Fernandez et al. | |
| 7,088,220 B2 * | 8/2006 | Kotzin | 340/5.82 |
| 2003/0167153 A1 | 9/2003 | Alexander | |
| 2004/0220798 A1 * | 11/2004 | Chi et al. | 704/201 |
| 2005/0226468 A1 * | 10/2005 | Deshpande et al. | 382/115 |
| 2006/0195328 A1 | 8/2006 | Abraham et al. | |
| 2008/0243393 A1 | 10/2008 | Yamamoto | |
| 2008/0281222 A1 | 11/2008 | Fukada | |

OTHER PUBLICATIONS

Artemis Solutions Group, Common Terminology Used in the Biometric Industry, 2006, 6 pages "http://www.artemis-usa.com/terms.htm".

Jennifer Healey, Skin Consuctance Definition, Feb. 12, 1999, 2 Pages. "http://vismond.media.mit.edu/tech-ereport/TR-483/node6.html".

* cited by examiner

*Primary Examiner* — Brandon Hoffman
*Assistant Examiner* — Michael D Anderson
(74) *Attorney, Agent, or Firm* — Whitham Curtis Christofferson & Cook, PC; Daniel P. Morris

(57) ABSTRACT

The present invention uses biometrics for the quantitative determination of software ease of use by collecting biometric data from a software user, identifying changes in the biometric data as the user uses the software, determining if the changes are indicative of software ease of use issues, and generating a signal as output if the changes are determined to be indicative of software ease of use issues. The sensors may be integrated into a computer mouse or other peripheral device with which the user comes in regular contact during use.

17 Claims, 6 Drawing Sheets

METHOD AND SYSTEM FOR QUANTITATIVE DETERMINATION OF SOFTWARE EASE OF USE

CROSS REFERENCE TO RELATED APPLICATION

This application is a continuation of application Ser. No. 11/327,068 filed Jan. 6, 2006, now abandoned.

BACKGROUND OF THE INVENTION

1. Field of the Invention

The present invention relates to the field of measuring software ease of use.

2. Background Description

Most software systems and applications provide at least one user interface. Such an interface may be graphical or it may be provided by a text input from a terminal, or from a set of dedicated peripheral devices. Similarly most applications, middleware and solutions provide user interfaces for purposes of configuring and installation. A user interface is required every time a person is expected to be the user of a software system or application.

It is always desirable, for efficiency purposes, to make interfaces as user-friendly as possible. The existing art, however, does not provide adequate quantitative methods to measure either ease of use or human-friendliness of a user interface in a manner that provides a sufficient correlation to the experience of a human being in configuring, installing and using the software.

Because ease of use is largely a matter of a user's subjective state of mind, which may not be susceptible to direct measurement, quantification of ease of use has relied on developing cognitive complexity metrics that are based on measurements of user interface actions, such as mouse clicks or other user interventions necessary to complete a process, which are more susceptible than a user's subjective state of mind to direct measurement and quantification. The number of mouse clicks required to accomplish a step, or the number of steps required to complete a process are only an approximate heuristic. Two clicks can be easier than one click if it is difficult to find the appropriate place to click in an one-click interface. For example, one click from a pull-down menu of very large items is not necessarily more user-friendly than two clicks from a set of appropriately-nested and well-presented pull-down menus arranged to provide information to a user without significant searching or scrolling. Similarly, two interfaces, both requiring a single click, may differ in ease of use if they impose different requirements on a user who is required to scroll or search through information in order to find the appropriate place to click. Since there is no way to understand the actual effect on the human beings, these metrics fall short of a satisfactory measure. Some measures of ease of configuration count the number of user steps required to configure a software application. However, these suffer from comparable limitations, in that a single step that is time-consuming to perform can be more frustrating to users than two or three steps, each of which takes a relatively small amount of time to perform.

Thus, the existing art does not provide an adequate quantitative determination of software ease of use.

SUMMARY OF THE INVENTION

It is therefore the object of the present invention to provide a method and apparatus for quantitative measure of the ease of use of a user interface, or of a configuration, installation or usage process, which may be directly correlated to the experience that a user may have when invoking the specified user interface or going through the specified configuration process. To this end, the present invention provides a method, a system, and computer-readable medium providing instruction for using biometric feedback data to determine software ease of use.

Biometric characteristics have the advantage of being subject to direct measurement and quantification, which is not true of a user's subjective state of mind. Use of biometric data to assess software ease of use can be deployed in experiments or tests to measure ease of use. Ease of use data for programs in actual operation can be collected experimentally by measuring a user's biometric characteristics, and changes in biometric characteristics, as the user performs tasks associated with the software configuration, installation and usage.

Examples of favorable variations in biometric characteristics may include, but are not limited to, a decrease in the pulse rate or a decrease in blood pressure. Examples of unfavorable variations in biometric characteristics may include, but are not limited to, an increase in pulse rate above normal or an increase in blood pressure.

Such biometric characteristics may include, without limitation, a human being's physiological state such as, body temperature, blood pressure, blood oxygen level, heart rate, skin conductance response, electromyographic (EMG) signals, electroencephalographic (EEG) signals, eye saccades or other metabolic processes. Changes in such biometric characteristics may be monitored, and a function combining variations in different biometric characteristics may be used, to determine the change in the mood of a user. Software would be considered easy to use if it produces relatively few variations in biometric characteristics, or if it produces biometric responses experimentally or experientially determined to be positive indicators for ease of use. By contrast, software would be considered difficult to use if, during ease of use testing, it produces a significant number of biometric responses experimentally or experientially determined to be negative indicators for ease of use.

Thus, appropriate biometric measurements can be used to determine if test users experience problems. Similar biometric measurements, if taken by a device integrated into a personal computer peripheral such as a keyboard or mouse, could be used to identify when a user is experiencing problems with software and recommend appropriate action such as directing a user to call a help-desk, displaying links to self-serve help pages on the web, or other appropriate action.

In order to determine the software complexity of the configuration, installation or usage process, the biometrics characteristics of the user are measured at least twice, at the beginning of the process and at the end of the process. The user's response to the experience of using the software can be observed through differences in these measurements. Software ease-of-use can then be determined through changes in the biometric characteristics at the beginning and the end of the process.

It is quite common for users of a software application to switch between several applications during its use. As an example, the use of an order-entry system may also be switching to browsing another web-browser during the invocation of the program. By correlating the application that a user is currently engaged in with the biometric measurements obtained from the devices, software ease of use can be done while filtering out the interactions of the user with other applications that may be concurrently running on the computer system.

One quantitative measure of software complexity can be obtained by computing a weighted average of the changes in the various characteristics described above. An increase in the blood pressure of the user may indicate, among other things, a higher level of user frustration or anxiety. An increase in heart rate, or decrease in oxygen level in blood, may similarly indicate, among other things, a higher level of user frustration or anxiety. A weighted average allows the incorporation of a combination of metrics to measure complexity in various ways. Instead of simply taking measurements at the beginning and end of a software installation, configuration or usage process, ease of use may also be determined or predicted by monitoring various biometric characteristics continuously or intermittently throughout software use and then computing an average function over the system.

Based on biometric feedback data, good quantitative measures of software ease-of-use can be estimated by having a sample set of users try out the software in test settings. Statistical analysis of biometric data obtained from a group of appropriately-selected testers could be used to produce a rating of the ease of use of the software.

In addition, peripherals equipped with appropriate biometric sensors could enable the present invention to be used to identify instances of software usage difficulties during everyday use of the software, outside of the context of testing. Computer keyboards and mice can be equipped with sensors that are capable of monitoring the biometric characteristics of a user. A computer mouse, for example, could be fitted with sensors to monitor a user's blood pressure, heart rate, temperature of the user, and/or the force exerted each time a mouse button is clicked. A keyboard could also be fitted with similar sensors, including sensors to monitor the force exerted each time a key is pressed. Measurements taken by such biometric-sensor-equipped peripherals could also be reported back to the software developer in order to identify instances in which difficulties are encountered in day-to-day use of the software.

Such a system for measuring software ease of use can be used for quantitative measurements in experimental studies conducted for a software, as well as to measure the ease-of-use of software by users during their production use.

The present invention thus provides a method, a system, and a computer readable medium providing instructions for using biometrics to determine software ease of use comprising: one or a plurality of sensors to collect biometric data from a user engaged in using software; a computer to identify changes in said biometric data; a biometrics database, or other source of baseline data, for determining if said changes are relevant to a determination of software ease of use; and a communications pathway to generate a signal as output if said changes are relevant to software ease of use. The sensors (one or more in number) may be integrated into a computer peripheral with which said user comes in regular contact while using said software, such as a computer mouse, keyboard, or other peripheral with which a software user is likely to make frequent contact, such as a computer screen in touch-screen systems or a peripheral attached to the user solely to take biometric data for purposes of the present invention. (If this is done, the peripheral must be one with which the user comes into regular contact while using the software, but it does not have to be one with which the user remains in constant contact while using the software, though it could be a peripheral with which the user remains in constant contact.) The biometric data collected by the sensors may or may not be communicated to a database. The output signal may include, without limitation, data describing the relevance of said changes to software ease of use. Such data may simply indicate whether the data is consistent with user ease of use or with user difficulty, and such data may also include more specific information on the difficulties apparently being encountered by the user, in which case this signal may activate the software's help routine.

The computer implemented method employing biometric measurements, which is provided according to the present invention, comprises the steps of: using sensors to collect biometric data from at least one user engaged in using software operating on a computer or computer network; monitoring changes in the biometric data occurring while the software is being used; and providing an output based on changes in the biometric data. The output of the computer implemented method may be a quantitative measurement of software ease of use. The quantitative measurement of the computer implemented method may be electronically stored or transmitted to another computer or computer network. The computer implemented method may be applied to multiple users, and the quantitative measurement may be user-independent and/or may be based on biometric data for each user. The output of the computer implemented method may be a context sensitive help message. The output of the computer implemented method may be provided based on a user-specific ease-of-use measure.

The computer system employing biometic measurements, which is provided according to the present invention, comprises: one or more sensors for collecting biometric data from at least one user engaged in using software operating on a computer or computer network; and software operating on said computer or computer network which (a) monitors changes in the biometric data occurring while the software is being used and (b) provides an output based on changes in the biometric data. At least one of the sensors may be associated with a peripheral device which is connected to or communicates with the computer or computer network. The peripheral device may be a mouse, tablet, track ball, or tablet. The output of the computer system may be a quantitative measurement of software ease of use. The computer system may further comprise a storage medium for storing said output. The computer system may be applied to a multiple users, and the quantitative measurement may be user-independent and/or may be based on biometric data for each user. The output of the computer system may be a context sensitive help message displayed on a display. The output of the computer system may be based on a user-specific ease-of-use measure.

The computer readable medium providing instructions for implementing a method employing biometric measurements, which is provided according to the present invention, comprises the steps of: using sensors to collect biometric data from at least one user engaged in using software operating on a computer or computer network; monitoring changes in the biometric data occurring while the software is being used; and providing an output based on changes in the biometric data. The output generated according to instructions provided by the computer readable medium may be a quantitative measurement of software ease of use. The instructions provided by the computer readable medium may further comprise instructions to electronically store or transmit the quantitative measurement to another computer or computer network. The instructions provided by the computer readable medium may be applied to multiple users, and the quantitative measurement may be user-independent and/or may be based on biometric data for each user. The output generated according to instructions provided by the computer readable medium may be a context sensitive help message. The output generated according to instructions provided by the computer readable medium may be provided based on a user-specific ease-of-use measure.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF A PREFERRED EMBODIMENT OF THE INVENTION

Figure 1:
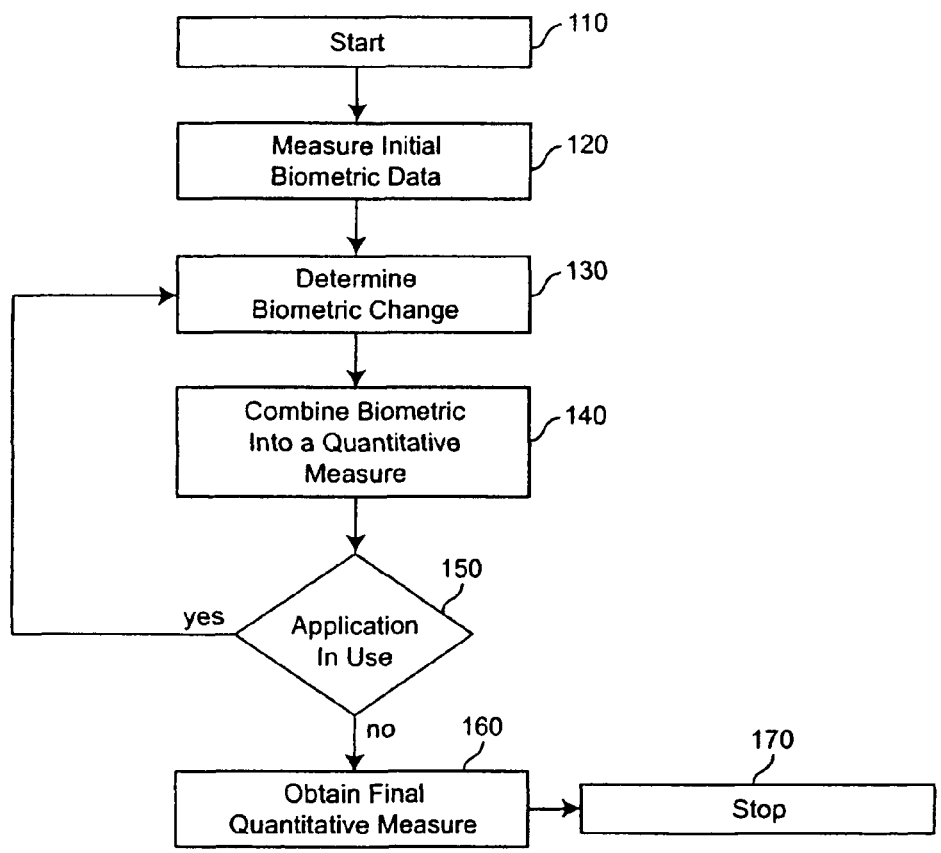
FIG. 1 is a flow-chart representing the steps of an implementation of the present invention.

Referring now to the drawings, and more particularly to FIG. 1, there is shown a basic implementation of the present invention which is used to measure the ease of use of a software system. The step 110 is entered when the software being analyzed for ease of use is initiated and is ready to receive interaction from the user. In step 120, an initial reading of the biometric data from a user engaged in using the software is taken. This reading can be when the user starts the software system on his/her computer. Some software systems are already running as background processes in a computer system (e.g., as daemon processes in UNIX operating systems). In the context of those systems, this reading can be taken when the user makes the first interaction with the software system. In step 130, more biometric data is collected and the changes from the original biometric data is determined. This would indicate conditions such as an increase in blood pressure, or a decrease in body temperature. In step 140, the biometric changes recorded are combined into a quantitative metric reflecting the software complexity. A determination is made in step 150 whether the software is still being used by the user. If so, the algorithm repeats back to step 130 in which more biometric measurements are taken and the quantitative measurement of the software complexity is updated. If the software is not actively used, the process terminates in step 170.

Figure 2:
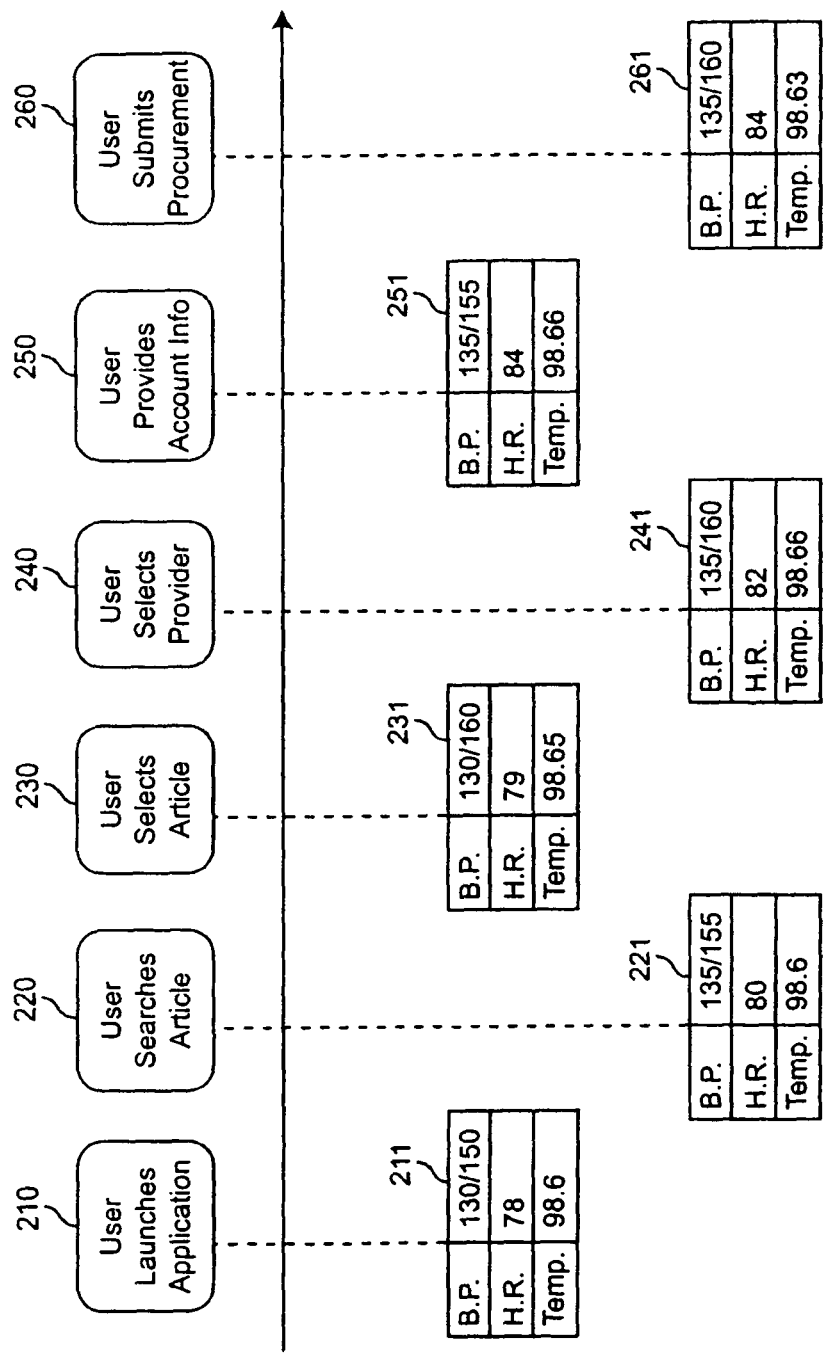
FIG. 2 is a representation of a sample situation in which the present invention can be applied to measure the ease of use quantitatively.

There are several biometric measurements that can be taken and combined as part of this process. FIG. 2 shows an illustrative example that provides a means by which the ease of use of a software component can be determined. Consider the case of a software application which is used by employees of a corporation to order supplies for their business needs, e.g. office supplies, computer parts and peripherals, and other material that needs to be procured. An employee running this software is using computer peripherals that are able to monitor and record his biometric data. Although many different types of biometric data can be recorded, for illustration purposes we will assume that his heart-rate, blood-pressure and body temperature are the three metrics being recorded.

FIG. 2 shows the snap-shot of the instances at which the measurement of the biometric data is made. The biometric data can be measured by the computer user every time a mouse-click or keyboard entry is made on the user-interface provided by the software. The user goes through the steps of typing the name of an article being procured (210) and searching for it (220), selecting the article that is to be procured from the results of the search (230), selecting a vendor for the article (240), completing the accounting information for the article (250), and then creating the procurement order (260). Table 211 shows the biometric information collected when the program is initially launched. Table 221 shows the biometric information collected when step 220 is completed, table 231 shows the biometric information collected when step 230 is completed, table 241 shows the biometric information collected when step 240 is completed, table 251 shows the biometric information collected when step 250 is completed, and table 261 shows the biometric information collected when step 260 is completed. In each table, the blood pressure (BP) is shown as systolic/diastolic measures, the temperature (Temp) in degrees Fahrenheit, and the heart rate (HR) in pulses per second.

On comparing the biometric data obtained in this manner, one can determine that the blood pressure of the user has slightly increased, and his heart-rate is also slightly increased, while the temperature remains relatively constant. A weighted average of the relative changes in the three metrics serves as a quantitative measure of the software complexity of the program being used. One simple manner to combine the ease of use would be to look at the relative change in the biometric data at the beginning and the end of the phase using the application. According to that metric, the systolic blood presume has increased by 3.8%, the diastolic blood pressure has increased by 6.6%, the heart rate has increased by 7.7%, and the temperature has increased by 0.003%. All of the changes are in the negative direction (what one would expect when the user of the software is vexed). These percentage rates of changes can be averaged to assign an ease of use index of −4.525 for this particular user. Another user may have different indexes that will be obtained from observing their reaction to the program. Averaging across multiple users will provide the average ease of use index for this application.

The metric provided in the above example is rather simplistic. In actual use, a metric that incorporates the fluctuations in the different readings is likely to be a much better indicator of the ease of use than simply measuring the initial and final biometric information. An example of such a measurement would be to take the relative change over time of the various indexes, and then use the average rate of change in each metric as the information to feed in determining software complexity.

Assuming that the user spends the same amount of time between each of the various steps shown in FIG. 2, the average rate of changes in each of the biometric measures being taken are as follows:

| Metric | Change 210-220 | Change 220-230 | Change 230-240 | Change 240-250 | Change 250-260 | Average Change |
|---|---|---|---|---|---|---|
| Systolic BP | 3.84% | −3.7% | 3.84% | 0% | 0% | 0.7% |
| Diastolic BP | 3.33% | 3.22% | 0% | −3.1% | 3.22% | 1.3% |
| Heart Rate | 2.5% | −1.25% | 3.8% | 2.4% | 0% | 1.5% |
| Temperature | 0% | 0.05% | 0.00% | 0% | 0.03% | 0% |

When computing the ease of use index, the weights assigned to each of the individual metrics need not be equal. Let us say that the weights assigned to systolic blood pressure, diastolic blood pressure, heart rate and temperature is in the ratio of 2:2:1:1. In that case, the ease of use index of the software using this method of computation would be −0.7. In general the higher the ease of use index, the more user-friendly the software is.

Other formulas than the ones shown above can be used to compute the ease of use index.

The ease of use index as computed above would be different for each of the users that invoke the applications. The information obtained from different users needs to be complied into a single quantitative measure for ease of use index for the software, which can then be used as a user-independent index for its ease-of-use.

One way to obtain a user-independent metric is by conducting studies and tests for users when they invoke a given application. Each user involved in the study would be monitored to determine a user-specific ease-of-use index for the software. Then the user-independent indices can be combined to form the user-independent ease-of-use index. An average of the user-specific indices can be used as the user-independent index, or other aggregation metrics, e.g., the spread (minimum and maximum) can be used as the user-independent ease-of-use index, or a percentile spread that eliminates outliers can be used.

The second approach would be to determine the ease-of-use of software when it is being used in deployment by real end-users, as opposed to a test environment or a field-study. The proposed invention provides a way to obtain the biometric information from the end-users of an application software so as to determine a user-independent estimation of software ease-of-use.

One of the problems in determining the ease of use of a software application in real use is the problem that people do not necessarily spend all the time continuously working on the same application. As an example, let us consider the case of the procurement application discussed in FIG. 2. In a real enterprise use, the procurement application may be deployed using as an application on the desktop of employees. An employee may have several applications deployed on the desktop, and can switch from one application use to another at different times. Thus, an employee may look up an item in the procurement application, then look for some specifics for that article on the web, and then return to the procurement application. Switching among different applications can impact the biometric data for the employees, and the interference from different applications needs to be taken into account when determining the ease of use for any given application.

Figure 3:
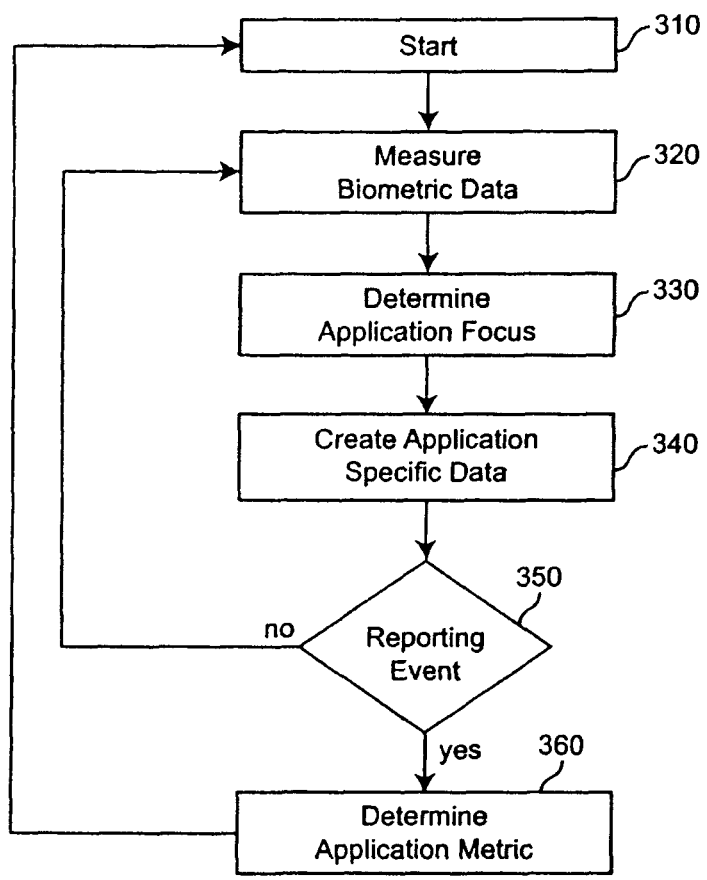
FIG. 3 is a representation of a flow chart showing how biometrics measurements can be adjusted to account for multi-tasking in a system.

FIG. 3 describes the process by which the interference from different applications can be taken into account. The process is started in step 310 when a user logs on to the computer to use it for any purpose. The computer is connected to different peripherals that can monitor and record biometric information. The computer keeps on recording the biometric information 320 at periodic intervals, at user-initiated events such as mouse-clicks and keyboard input. At each of the user initiated event, the computer keeps track of the application to which that input is directed. The application that is the focus of user interaction is tracked in step 330. When the measurement is time-driven instead of user-initiated, the window in which the user input is focused on is taken as the application on which focus is directed. In step 340, the biometric information is recorded separately for the different applications to which the user is switching to. Some of the user generated events, e.g. mouse clicks or application launches, cause focus to switch on to different applications. Users biometric information is collected both when an application goes out of focus and when a new application is brought into focus.

Every time a new biometric data is recorded, the process checks to make sure if a recording event has occurred in step 350. A recording event may include termination of an application, or when an application has not been used for a predetermined amount of time implying it has been implicitly terminated. If a recording event has occurred for any application, in step 360 the process computes a complexity metric for the application by looking only at those biometric data points that have been collected when the application was in the focus, moved into the focus, or moved away from the focus. After this reporting, the process continues to collect biometric information from the user.

Figure 4:
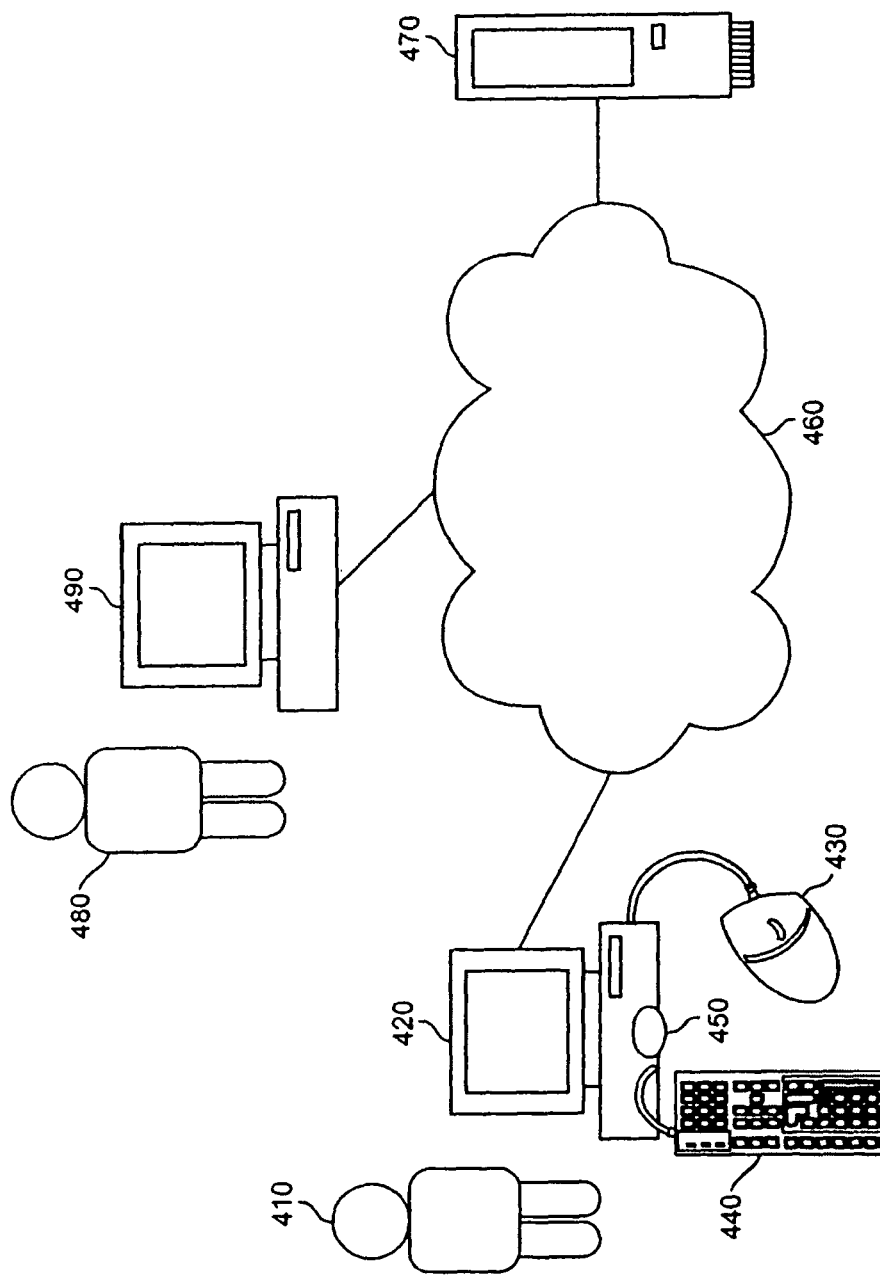
FIG. 4 is a representation of a system for using biometrics to determine software ease of use from users in the field according to the present invention.

Having determined only the biometric data points that are relevant for an application, software ease of use in the field is determined by means of a set up shown in FIG. 4. A user 410 is shown using a computer 420 to which peripherals capable of taking biometric measurements are attached. An example of such a peripheral is a mouse 430 which integrates within itself sensors that can collect biometric readings such as blood pressure and heart-rate. Another example of such as a peripheral is a keyboard 440 which can measure the force with which users are typing on the keyboard, and use increase in that force as a measure of user frustration. The computer includes software 450 which is used for creating the application specific data-set described by the process of FIG. 3. The software 450 reports the biometric data metrics for an application of the user via a computer network 460 to a server 470. The Internet is an example of the computer network 460. The server 470 receives the information from other users of the application, e.g., a user 480 which is working on a separate computer 490. The server 470 combines the biometric information from all of the users to obtain a user-independent ease-of-use index.

Figure 5:
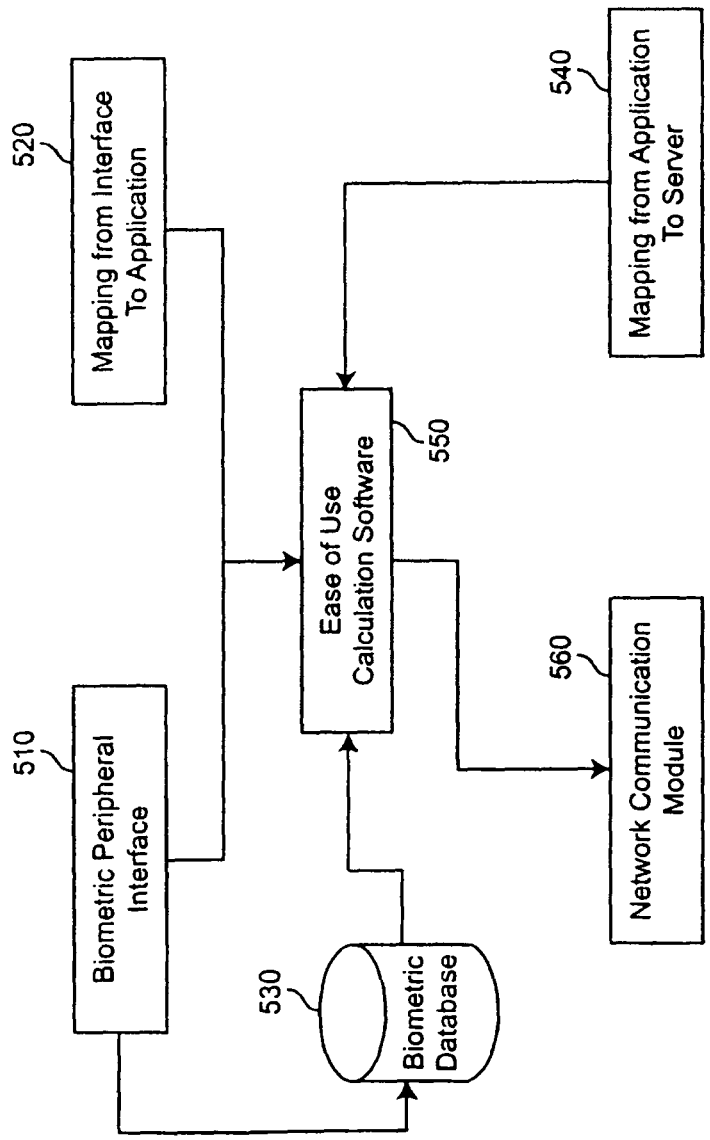
FIG. 5 is a representation of a computer mouse into which sensors have been integrated according to the present invention.

The structure of software 450 which can be used for collecting ease of use information from the field is provided in FIG. 5. The software consists of means to collect and record biometric data from peripherals 510; a means for mapping the current interface to an application 520; a means for mapping an application to a server 540; a database to store the biometric information for each application 530; a means to calculate the software ease of use for any application 550; and a means to communicate over the network 560. The means to collect and record biometric data from peripherals interacts with devices like keyboard and mouse with enhanced sensors to obtain the current biometric readings for a user. The component 520 is responsible for mapping the current window on which a user is focused, the current console to which typing; or the input that he is using to an application. This component can perform this mapping by knowing which process owns the window/interface that is currently being focused on, and by determining the application that owns that process in the operating system. The component 540 determines the server that needs to obtain the information about the application ease of use over the Internet, or another such network. The component 530 stores the biometrics information for processing into the ease-of-use index for the current user. The database can be uploaded to a server over the network, if required. The component 550 is responsible for executing the algorithms described in FIG. 1 and FIG. 3 of the application. Component 550 can be implemented as a set of libraries, each one customized for a specific application, or as a generic software module which can be reused for multiple applications by defining some configuration parameters. The reporting of information to the server on the network happens via the network communication module 560.

The system used for collecting ease of use information can be used for purposes other than simply reporting software ease-of-use metrics. The information can be used to identify when users are having problems dealing with a specific software component, and a help menu can be initiated when the user is perceived to be having problems in using the software. A context sensitive help information can be popped up to the user to provide helpful information about the software that he/she is encountering difficulty with.

Figure 6:
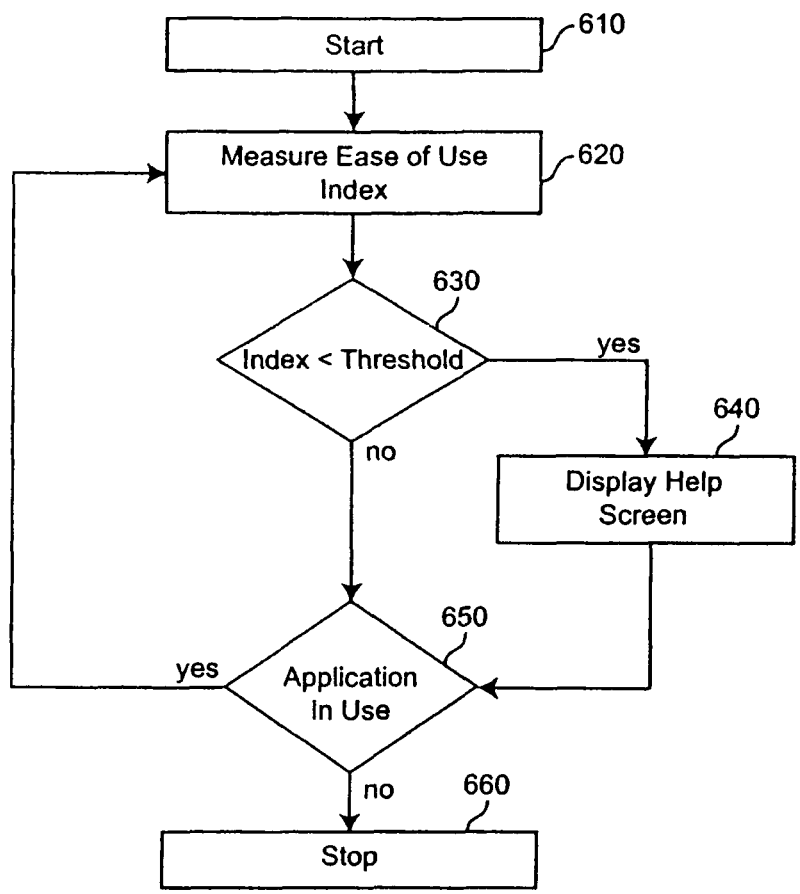
FIG. 6 is a process usable to deliver a type of help-information to a user.

A process that can be used to deliver this type of help-information is shown in FIG. 6. The process is entered in step 610 when a user logs-in, and it continuously monitors the biometric characteristics of the user as determined to be relevant for an application according to the flow chart shown in FIG. 3. The system continuously keeps on computing the ease-of-use index for the application in step 620. When the ease-of-use index falls below a predefined threshold in step 630, the system prompts the user if he would like help with the application in step 640. Depending on the relative priority of the user, the user may be connected to the help-desk that can guide the user through the application. Alternatively, context-sensitive help menus can be shown in the screen of the user to provide assistance in the task that he/she is involved in. Otherwise, the system checks that the application is still being used in step 650 and if so continues to check the ease of use index in step 620. If the application is not being used, the process terminates in step 660.

The information collected about biometric data of users can be analyzed to create other applications. One such analysis would be to compute software ease-of-use indices for different steps required within an application, as opposed to computer the ease-of-use for the overall application. The portion of the software that is determined to be difficult to use can then be modified to improve its usability.

Having thus described our invention, what we claim as new and desire to secure by Letters Patent is as follows:

1. A computer implemented method for quantitative determination of software ease of use, comprising the steps of:
    using sensors to collect biometric data from each of a plurality of users engaged in using a software application operating on a computer or computer network;
    monitoring and recording changes in the biometric data which occur while the software application is being used by each of the plurality of users;
    combining recorded changes in the biometric data for each user into quantitative metrics;
    averaging quantitative metrics across the plurality of users;
    compiling the averaged quantitative metrics into a single quantitative measure for an ease of use index for the software application; and
    providing an output as a user-independent index for ease-of-use of the software application.

2. The computer implemented method of claim 1 wherein more than one software application may be running on a computer used by anyone of the plurality of users, further comprising the steps of:
    determining a specific software application for which an ease-of-use index is to be determined; and
    for the specific software application, creating application specific biometric data used in determining the user-independent index for ease-of use of the software application.

3. The computer implemented method of claim 1, wherein said user-independent index for ease-of-use of the software application is electronically stored or transmitted to another computer or computer network.

4. The computer implemented method of claim 1, further comprising the steps of:
    establishing a threshold for the ease-of-use index for a software application;
    determining if the threshold has been exceeded by an individual user of the software application; and
    if the threshold is exceeded by the individual user, displaying a context sensitive help message.

5. The computer implemented method of claim 4 wherein said context sensitive help message is provided based on a user-specific ease-of-use measure.

6. A computer system for quantitative determination of software ease of use, comprising:
    sensors for collecting biometric data from each of a plurality of users engaged in using a software application operating on a computer or computer network; and
    software operating on said computer or computer network which
    a) monitors and records changes in the biometric data which occur while the software application is being used by each of the plurality of users;
    b) combines recorded changes in the biometric data for each user into quantitative metrics;
    c) averages quantitative metrics across the plurality of users;
    d) compiles the averaged quantitative metrics into a single quantitative measure for an ease of use index for the software application; and
    e) provides an output as a user-independent index for ease-of-use of the software application.

7. The computer system of claim 6 wherein at least one of said sensors is associated with a peripheral device which is connected to or communicates with said computer or computer network.

8. The computer system of claim 7 wherein said peripheral device is a mouse, tablet, track ball, or tablet.

9. The computer system of claim 6 wherein said user-independent index for ease-of-use of the software application is electronically stored or transmitted to another computer or computer network said output is a quantitative measurement of software ease of use.

10. The computer system of claim 9 further comprising a storage medium for storing said user-independent index for ease-of-use of the software application.

11. The computer system of claim 6, wherein for a specific software application a threshold is established for the ease-of-use index for the specific software application, said software operating on said computer or computer network further
    f) determines if the threshold has been exceeded by an individual user of the software application; and
    g) if the threshold is exceeded by the individual user, displaying a context sensitive help message displayed on a display.

12. The computer system of claim 11 wherein said context sensitive help message is provided based on a user-specific ease-of-use measure.

13. A computer readable non-transitory medium providing instructions for implementing a method for quantitative determination of software ease of use, comprising the steps of:
    using sensors to collect biometric data from each of a plurality of users engaged in using a software application operating on a computer or computer network;

monitoring and recording changes in the biometric data which occur while the software application is being used by each of the plurality of users;

combining recorded changes in the biometric data for each user into quantitative metrics;

averaging quantitative metrics across the plurality of users;

compiling the averaged quantitative metrics into a single quantitative measure for an ease of use index for the software application; and providing an output as a user-independent index for east-of-use of the software application.

14. The computer readable non-transitory medium of claim 13 wherein more than one software application may be running on a computer used by anyone of the plurality of users, further comprising the steps of:

determining a specific software application for which an ease-of-use index is to be determined; and for the specific software application, creating application specific biometric data used in determining the user-independent index for ease-of use of the software application.

15. The computer readable non-transitory medium of claim 13, further comprising instructions to electronically store or transmit said user-independent index for ease-of-use of the software application to another computer or computer network.

16. The computer readable non-transitory medium of claim 13, further comprising instructions for implementing the steps of:

establishing a threshold for the ease-of-use index for a software application;

determining if the threshold has been exceeded by an individual user of the software application; and if the threshold is exceeded by the individual user, displaying a context sensitive help message.

17. The computer readable non-transitory medium of claim 16 wherein said output is provided based on a user-specific ease-of-use measure.

* * * * *